Sept. 14, 1937.   R. DEMING   2,093,188

SEALING DEVICE

Filed Nov. 1, 1935

INVENTOR
Robert Deming
BY Evans & McCoy
ATTORNEYS

Patented Sept. 14, 1937

2,093,188

UNITED STATES PATENT OFFICE 2,093,188

SEALING DEVICE

Robert Deming, Norwood, Ohio

Application November 1, 1935, Serial No. 47,850

3 Claims. (Cl. 230—205)

This invention relates to sealing devices for preventing leakage of fluid through a shaft bearing, and is particularly applicable to the shafts of rotary pumps.

The invention has for its object to provide a sealing device in which movable sealing elements are held in sealing engagement by fluid pressure.

A further object is to provide a device in which the amount of pressure to which the sealing devices are subjected is regulable.

A further object is to provide a sealing device which is effective when pressure is applied either inwardly or outwardly.

With the above and other objects in view, the invention may be said to comprise the device as illustrated in the accompanying drawing hereinafter described and particularly set forth in the appended claims, together with such variations and modifications thereof which will be apparent to one skilled in the art to which the invention appertains.

Reference should be had to the accompanying drawing forming a part of this specification in which.

Figure 1:
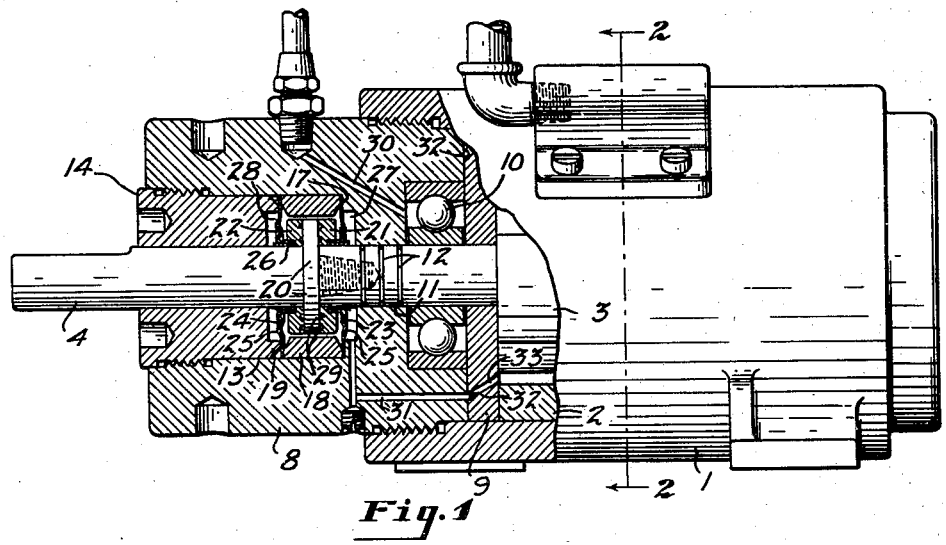
Figure 1 is an axial section through one of the end bearings of a rotary pump showing the sealing device of the present invention.
Figure 3:
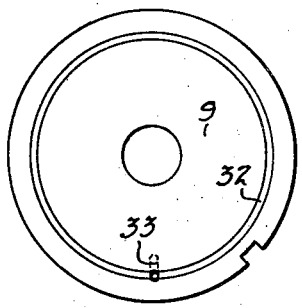
Fig. 3 is a side elevation of the adjustable washer by which the pressure in the chamber of the sealing device can be connected to any desired part of the pump chamber to provide various degrees of pressure or vacuum.
Figure 2:
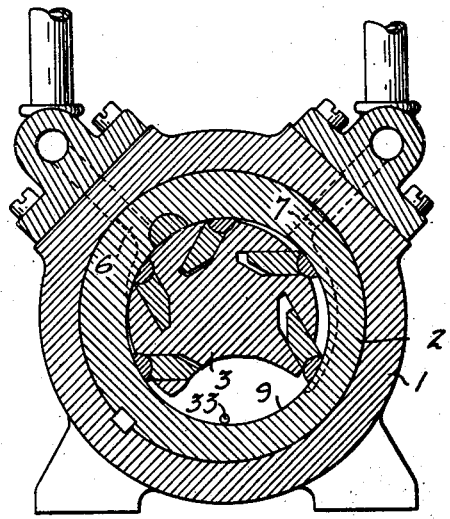
Fig. 2 is a section taken on the line 2—2 of Fig. 1.
Figures 4, 5:
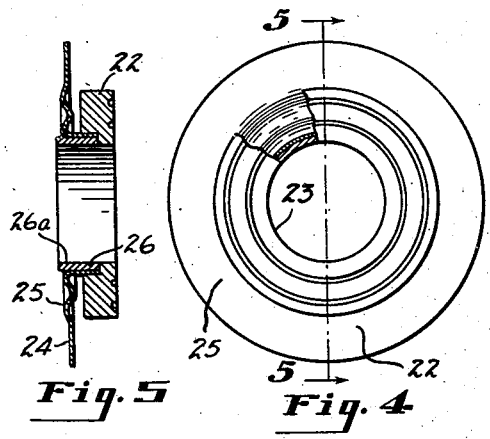
Fig. 4 is a side elevation of one of the sealing washers and diaphragm.
Fig. 5 is a section taken on the line indicated at 5—5 in Fig. 4.

Referring to the accompanying drawing, in which the device of the present invention is shown applied to a rotary pump or compressor, the pump has a housing 1 of a tubular form within which is mounted a cylindrical sleeve 2 which forms the peripheral wall of the pump chamber in which is mounted a rotor 3 fixed to a shaft 4 and carrying slidable vanes 5. The bore of the sleeve 2 is eccentric with respect to the external cylindrical surface thereof which fits in the housing 1, but eccentric with respect to the pump chamber formed by the bore of the sleeve 2. The pump is provided with an inlet 6 and an outlet 7, and has a head 8 which provides a bearing for the rotor shaft 4. The head 8 has threaded engagement with the housing 1 and a washer 9 is clamped between the sleeve 2 and the head 8. The inner end of the head 8 is provided with a counterbore to receive a ball bearing 10 which is mounted in the counterbore immediately to the outside of the washer 9. The rotor shaft 4 has a running fit in the washer 9 and in the bore of the head 8 at 11 outwardly of the ball bearing 10. Within the bearing portion 11 of the head the shaft has parallel, circumferential grooves 12 which serve to impede the flow of fluid outwardly along the surface of the shaft 4. At its outer end the head 8 has a relatively deep counterbore 13 which receives a threaded plug 14 which has an axial bore to receive the shaft 4 in which the shaft has a running fit. At the inner end of the counterbore 13 a second smaller counterbore provides an annular shoulder 17 against which is seated a ring 18 which has a close fit in the counterbore 13. At its inner end the plug 14 is provided with a counterbore which provides a marginal flange 19 at the inner end of the plug. The ring 18 is clamped between the flange 19 and the annular shoulder 17.

Upon the shaft 4 there is a circumferential flange 20 within the ring 18, a suitable clearance being provided between the flange 19 and the interior of the ring to permit free rotation. The opposite side faces of the flange 20 are surfaces of revolution, adapted to have close engagement with non-rotating sealing elements. As shown herein, these surfaces are flat, lying in a plane perpendicular to the axis of the shaft. On opposite sides of the flange 20 sealing elements in the form of washers 21 and 22 are mounted, the washers 21 and 22 having faces adapted to engage opposite side faces of the flange 20. The shaft 4 has a running fit in both washers, and the washers 21 and 22 have diaphragms 23 and 24 attached thereto. The diaphragms 23 and 24 are flexible, being provided with corrugations 25 and with inwardly extending flanges 26 at their inner margins which are attached to the washers by welding, brazing, or the like. The flanges 26 space the diaphragms 23 and 24 slightly from the outer faces of the washers 21 and 22. The flanges 26 are also attached to sleeves 26ᵃ which slide on the shaft 4 and which project past the outer faces of the diaphragms to engage with adjacent bearing members to limit the deflection of the diaphragms 20 so as to prevent them from being stressed beyond their elastic limit. The outer margin of the inner diaphragm 23 lies between the ring 18 and the shoulder 17, and the outer margin of the diaphragm 24 lies between the outer edge of the ring 18 and the flange 19 of the plug 14. When the plug 14 is screwed tightly in place the outer marginal edges of the diaphragms 23 and 24 are firmly clamped between the ring 18 and the shoulder 17 and flange 19, providing a fluid-tight seal against leakage past the outer edges of the diaphragms.

The counterbores in the plug 14 and in the head provide a pressure chamber 27 inwardly of the diaphragm 23 and a pressure chamber 28 outwardly of the diaphragm 24. It will be apparent that fluid pressure in the chamber 27 or 28 will press the diaphragm 23 or 24 inwardly, causing the washer 21 or 22 to bear with pressure against the adjacent face of the flange 20. The fluid tending to leak outwardly along the shaft 8 must pass the sealing grooves 12 in the bearing portion 11 to the chamber 27 between the washer 21 and the shaft 8, outwardly between the inner face of the washer 21 and the contiguous face of the flange 20, around the periphery of the flange and between the washer 22 and the flange and between the washer 22 of the shaft, and through the bearing portion of the plug 14. To further impede the leakage of fluid between the washers 21 and 22 and the flange 20, the washers are provided on the flange-engaging faces thereof with concentric grooves 29.

Lubricant under pressure may be supplied to the ball bearing 10 through an oil passage 30 and the pressure within the chamber 27 may be varied by establishing communication with different portions of the pump chamber, in which different pressures exist. A passage 31 leads from the chamber 27 radially outwardly and then axially to the inner end of the head 7. The washer 9 has a circular groove 32 on its outer face which communicates with the passage 31. The washer also has a passage 33 which extends from the inner face thereof to the groove 31. In any of the angular positions of the washer 9 there is communication between the interior of the pump chamber and the chamber 27 through the passage 33, groove 32, and passage 31, the passage 33 opening into the pump chamber outwardly of the body of the rotor. The washer 9, which is concentric with the rotor 3 and housing 1, may be adjusted circumferentially to establish communication through the passage 33 with any desired part of the pump chamber. For example, the passage 33 may be positioned adjacent the outlet of the pump to transmit a relatively high pressure to the chamber 27 or may be positioned adjacent the inlet where a subatmospheric pressure exists, to create a subatmospheric pressure in the chamber 27. Intermediate the two extremes the washer 9 may be set to provide any pressure desired in the chamber 27.

It will be apparent that, by adjusting the washer 9, fluid pressure may be exerted against either the sealing washer 21 or the diaphragm 23 or the diaphragm 24 to press against the flange 20, depending on whether the pressure in the chamber 27 is above or below atmospheric, atmospheric pressure being normally maintained in the chamber 28. Regardless of any fluctuations of pressure in the chambers 27 and 28, an effective seal will always be maintained, since at least one of the washers will always be pressed against the flange 20. If desired, the diaphragms 23 and 24 may be constructed to normally press the washers 21 and 22 lightly against opposite side faces of the flange 20. It will be apparent that the present invention provides a very effective seal against escape of fluid, liquid or gaseous, through the bearing of a rotating shaft, and that the sealing device is effective, even though the fluid at the surface of the shaft may be subjected to high pressure.

Furthermore, it is to be understood that the particular forms of apparatus shown and described, and the particular procedure set forth, are presented for purposes of explanation and illustration, and that various modifications of said apparatus and procedure can be made without departing from my invention as defined in the appended claims.

What I claim is:

1. A sealing device for the shaft of a rotary pump, comprising a head having a bearing portion through which the shaft extends, an enlarged chamber intermediate the ends of the bearing portion, a flange on the shaft within said chamber, said flange having substantially continuous side faces which are surfaces of revolution, two sealing washers having a sliding fit on the shaft, one on each side of said flange, each having a side face engageable with the flange, two flexible annular diaphragms, each having a sealing connection at its inner margin with one of said washers and at its outer margin with the wall of said chamber, means for conducting fluid under pressure from the interior of the pump to said chamber exteriorly of one of said diaphragms, and means for adjusting the fluid conducting means to connect the same with different portions of the pump chamber to vary the pressure exerted on the diaphragm.

2. A sealing device for the shaft of a rotary pump comprising a head having a bearing portion through which the shaft extends, a pressure chamber surrounding said shaft intermediate the ends of the bearing portion, a fluid pressure operated sealing device in said chamber, a passage in said head extending from said chamber to the inner face of the head and a washer within the pump bearing against the inner face of said head and angularly adjustable about the axis of the pump, said washer having an annular groove in the face thereof contiguous to the head which communicates with said passage, and an opening therethrough which communicates with said groove whereby adjustment of said washer connects the pressure chamber with different portions of the pump chamber and varies the pressure exerted upon the sealing means.

3. A sealing device for the shaft of a rotary pump, comprising a head having a bearing portion through which the shaft extends, an enlarged chamber intermediate the ends of the bearing portion, a flange on the shaft within said chamber, said flange having substantially continuous side faces which are surfaces of revolution, two sealing washers having a sliding fit on the shaft, one on each side of said flange, each having a side face engageable with the flange, two flexible annular diaphragms, each having a sealing connection at its inner margin with one of said washers and at its outer margin with the wall of said chamber, a passage in said head extending from said chamber exteriorly of one of said diaphragms to the inner face of the head, and a washer within the pump bearing against the inner face of said head and adjustable angularly about the pump axis, said washer having an annular groove on the face thereof contiguous to the head which communicates with said passage and an opening therethrough which communicates with said groove.

ROBERT DEMING.